May 12, 1970
E. UIGA
3,512,086
AC VOLTAGE MEASURING SYSTEM UTILIZING
VARIABLE RATIO TRANSFORMER
Filed Feb. 15, 1967
4 Sheets-Sheet 1
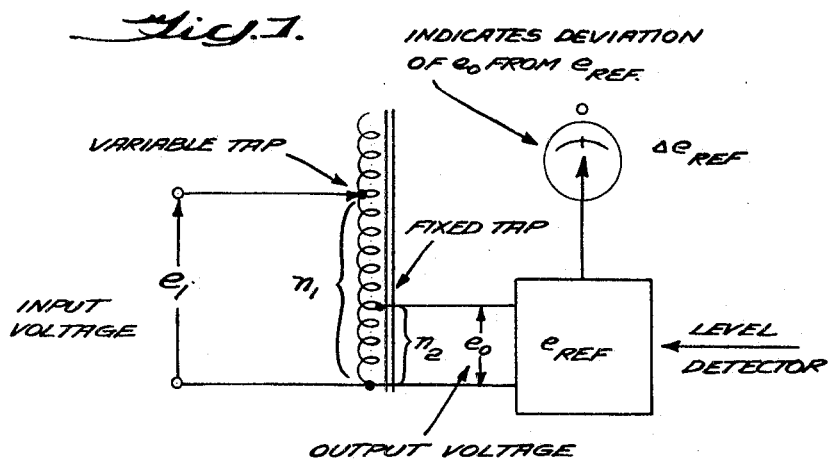
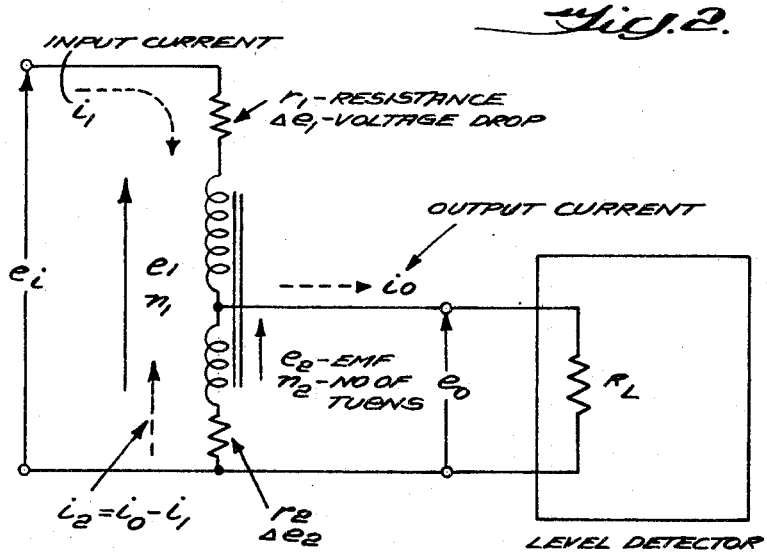
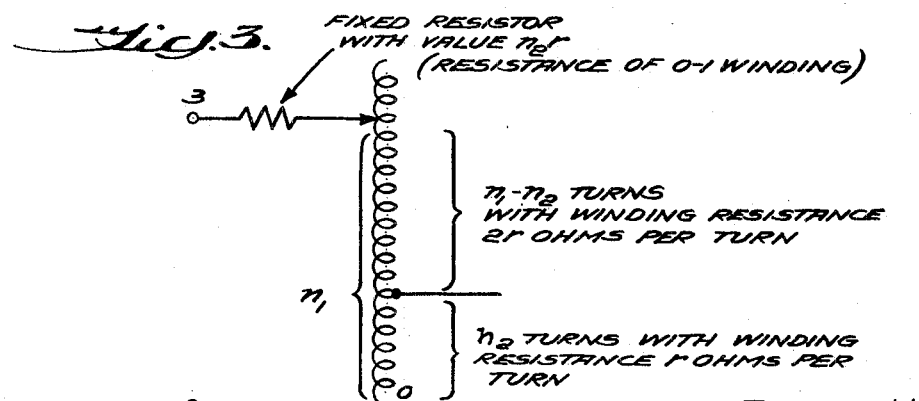
INVENTOR
Endel Uiga
BY Pierce, Scheffler & Parker
ATTORNEYS

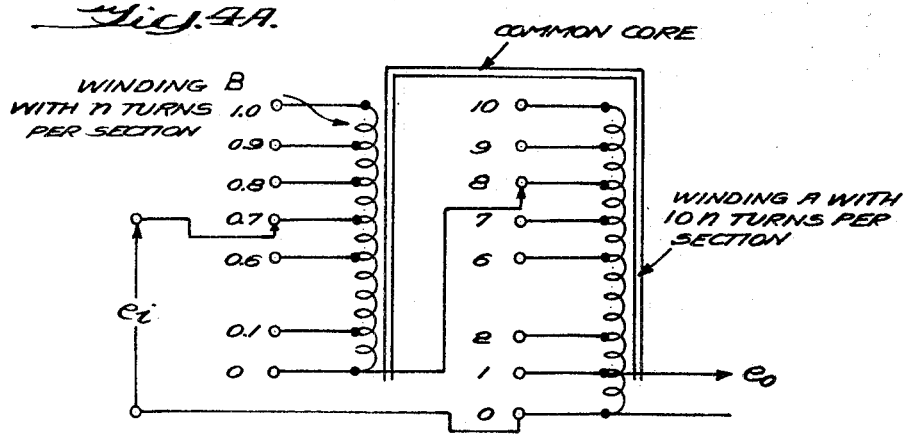
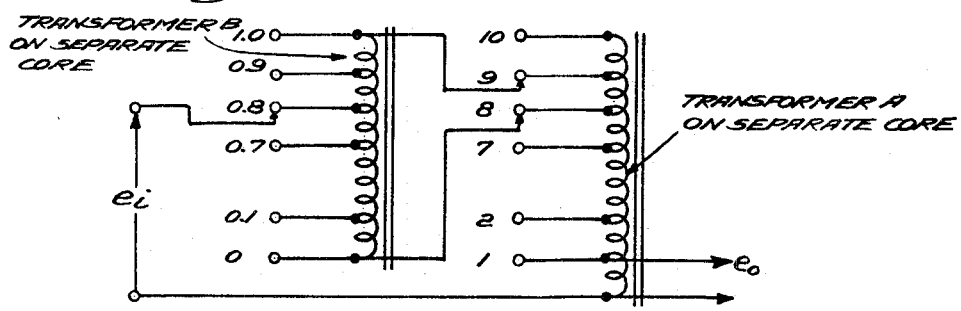
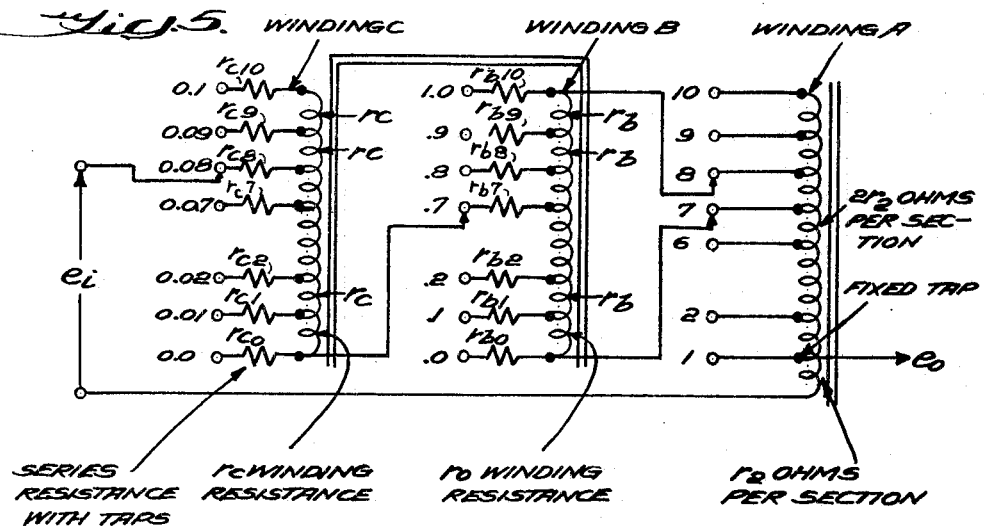

INVENTOR
Endel Uiga

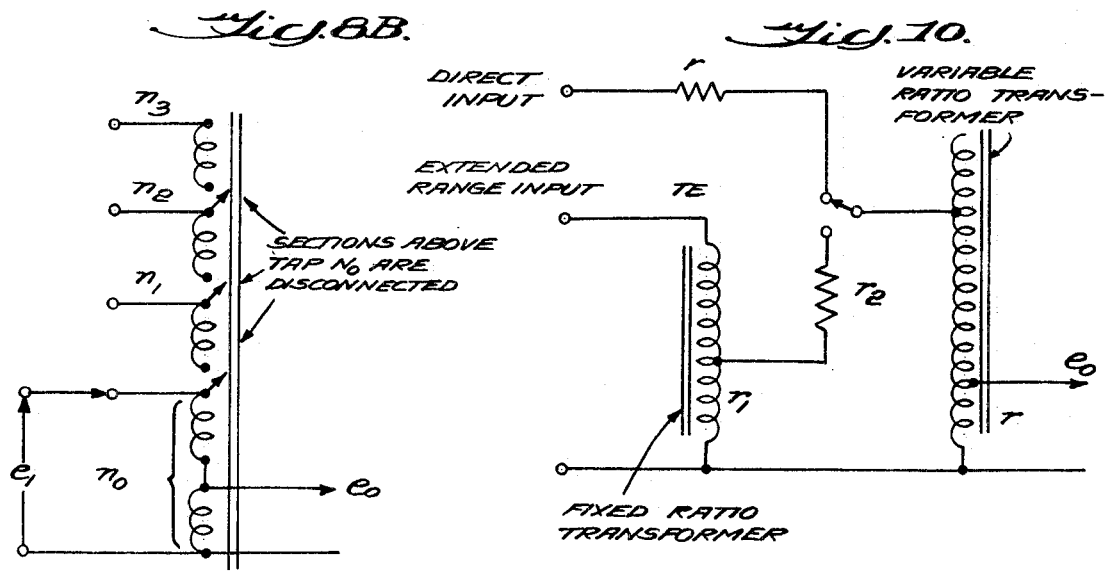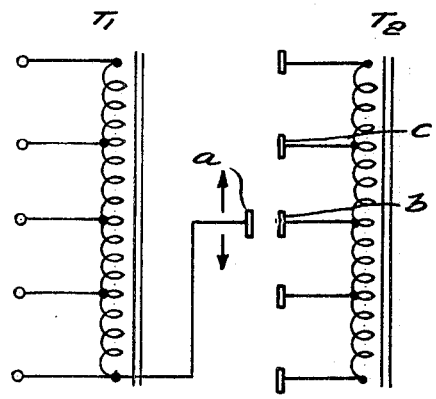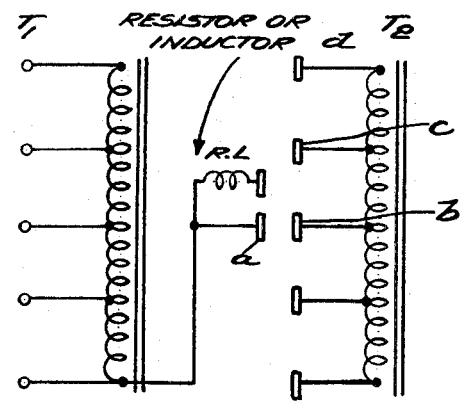

3,512,086
Patented May 12, 1970

3,512,086
AC VOLTAGE MEASURING SYSTEM UTILIZING VARIABLE RATIO TRANSFORMER
Endel Uiga, Rockaway, N.J., assignor, by mesne assignments, to The Singer Company, New York, N.Y., a corporation of New Jersey
Filed Feb. 15, 1967, Ser. No. 616,406
Int. Cl. G01r 17/00
U.S. Cl. 324—98         9 Claims

ABSTRACT OF THE DISCLOSURE

A system for measuring A.C. voltages which comprises a variable ratio transformer and a voltage level indicator which can be comprised of two thermocouples whose DC ouputs are arranged in series and opposition and connected to a galvanometer. A known, reference voltage is applied to one thermocouple and the output from a fixed tap on the transformer is applied to the other thermocouple. The unknown voltage is applied to a variable tap on the transformer which is adjusted, thus effecting a change in the transformation ratio, until a preset reference level e.g. zero on the galvanometer is reached. The value of the unknown voltage may now be derived from the value of the reference level and the ratio of the transformer. A stable gain amplifier may be connected between the fixed output tap on the transformer and the level indicator to increase input impedance and hence also the sensitivity of the voltage measuring system.

FIELD OF THE INVENTION

The present invention relates to the art of measurement of voltages and is particularly directed to a new concept in instrumentation for voltage measurement systems of the type wherein the unknown voltage is compared with a known, reference voltage.

DESCRIPTION OF THE PRIOR ART

Various types of systems have been designed for measurement of unknown voltages among which are those in which the unknown voltage is compared with a reference voltage either by means of a bridge or other well known comparison systems.

SUMMARY OF THE INVENTION

The principal object of the invention is to provide a unique system for measuring unknown voltages which provides a high precision of measurement and which also has a high degree of stability therefore establishing a mode of voltage measurement having the high degree of accuracy required in standards laboratories. This objective is attained through use of the general principle of comparing the unknown voltage with a known voltage serving as a reference standard. The improved instrumentation comprises a variable ratio transformer and a voltage level indicator which can be comprised of two thermocouples whose DC outputs are arranged in series and opposition and connected to a sensitive galvanometer. A known reference voltage is applied to one thermocouple and the output from a fixed tap on the transformer is applied to the other thermocouple. The unknown voltage is applied to a variable tap on the transformer which is adjusted, this effecting a change in the transformation ratio until a preset reference level, e.g. zero, on the galvanometer is reached. The value of the unknown voltage may now be derived from the value of the reference level and the transformer ratio.

Input impedance and hence also the sensitivity of the voltage measuring system may be increased by insertion of a stable gain amplifier between the fixed output tap on the transformer and the level indicator.

In lieu of a single variable ratio transformer which limits the transformation ratio increment to a minimum of one turn, the measurement system can be further improved by use of several transformers so interconnected as to enable ratio increments smaller than one turn to be achieved.

Moreover, with conventional transformers, the ratio of input and output voltage is not exactly equal to the turns ratio, the deviation being attributable to several factors, in which the most dominant is winding resistance. By means of an improved design of the winding resistances in accordance with the invention, this source of error is essentially eliminated.

The improved voltage measuring system also provides for the elimination of switching transients normally encountered when changing ratios of a variable ratio transformer and for extending the range of the measuring system by adding on a constant ratio input transformer ahead of the variable ratio transformer and through which the input, unknown voltage is applied prior to reaching the variable ratio transformer.

Provision is also made in the improved measuring system for eliminating the effect of drift in the sensed level due to a change in thermocouple temperature. This desirable effect is achieved by enclosing both thermocouples within a temperature stable enclosure which assures that the temperature of both thermocouples will change at the same rate. Thus, any change in thermocouple response to a change in temperature will be essentially equal provided that like thermocouples are used and will cancel out since their outputs are connected in opposition.

BRIEF DESCRIPTION OF THE DRAWINGS

In the accompanying drawings which illustrate various embodiments of the invention:
FIG. 1 is a schematic wiring diagram of the basic elements of the improved voltage measuring system employing but a single variable ratio transformer;
FIG. 2 is a schematic diagram of the system depicted in FIG. 1 to facilitate an understanding of measuring error introduced by the presence of circuit resistances;
FIG. 3 is a view similar to FIG. 2 to facilitate an understanding of an improved arrangement for the winding resistances to eliminate error attributable to resistance;
FIGS. 4A and 4B are schematic electrical diagrams of modified embodiments of the invention in which a plurality of interconnected variable ratio transformers are employed for the purpose of increasing the precision of the measurement;
FIG. 5 is a schematic electrical diagram of the embodiment illustrated in FIG. 4 and which further includes compensation resistors to achieve a mode of operation according to the principle described in relation to FIG. 3;
FIGS. 8A and 8B are schematic electrical diagrams illustrating a modification providing disconnection of the ratio transformer's windings not in use in order to reduce the input capacitance of the measuring system;
FIGS. 9A and 9B are schematic electrical diagrams illustrating a modification providing a reduction in switching transient when a tap on the ratio transformer is selected;
and FIG. 10 is a schematic electrical diagram illustrating a further modification wherein an additional input transformer for the unknown voltage is connected into the system ahead of the ratio transformer so as to provide for an increase in the range of the measuring system.

DESCRIPTION OF THE PREFERRED EMBODIMENTS

Figure 6:
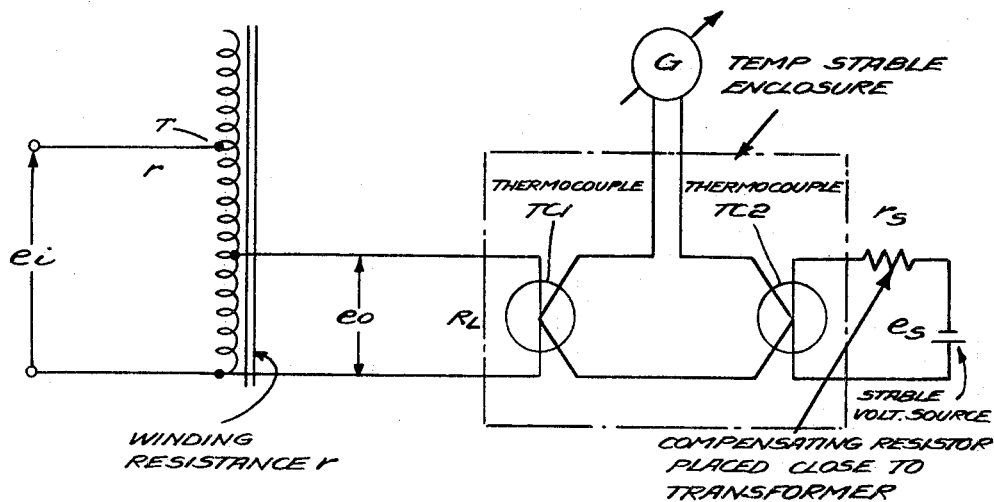
FIG. 6 is a schematic electrical diagram of one suitable level detection device which makes use of two thermocouples connected in series opposition to the level indicator galvanometer instrument.

With reference now to the drawings and to FIG. 1 in particular, which illustrates an embodiment of the invention in its most simplified form, the unknown voltage $e_i$ to be measured is applied to a variable tap on the winding of transformer T. The in-circuit turns of the primary determined by the position of the tap are denoted by $n_1$. From a fixed tap on this winding, the number of turns of which is denoted by $n_2$ (or as an alternative from a separate secondary winding on the transformer, not illustrated) an outlet voltage $e_o$ is obtained which is in the following relationship with the unknown, measured voltage $e_i$.

$$\frac{e_i}{e_o} = \frac{n_1}{n_2} \quad (1)$$

Where $n_1$ and $n_2$ are the number of turns to the input tap and output tap, the voltage $e_o$ is fed to a level detector which indicates when the output voltage equals a set reference voltage $e_{ref}$. This circuit may also indicate a percentage or absolute deviation of output voltage from reference voltage.

When the ratio of transformer T is set so that the output voltage $e_o$ equals the reference voltage $e_{ref}$, as indicated by the level detector, the measured voltage $e_i$ may be calculated:

$$e_i = \frac{n_1}{n_2} e_{ref} \quad (2)$$

The unknown voltage is proportional to the number of primary turns $n_1$. By proper selection of the ratio $e_{ref}/n_2$ the number of turns $n_1$ could be made a direct indication of input voltage $e_i$ or a multiple of it.

In practical transformers the ratio of input and output voltage is not exactly equal to the turns ratio. The deviation is caused by several factors, the dominant of them being the winding resistance.

A schematic of a transformer with winding resistances is shown on FIG. 2. This circuit also considers the input resistance $R_L$ of the level indicating device. Applying circuit analysis to this circuit starting with the assumption that the EMF induced in each winding is proportional to the number of turns in the winding:

$$\frac{e_1}{e_2} = \frac{n_1}{n_2} = a \quad (3)$$

and $$\frac{i_1}{i_2} = \frac{n_1 - n_2}{n_2} = a - 1 \quad (4)$$

one could write the following simultaneous equation—

$$\begin{cases} e_i = e_1 + \Delta e_1 = e_2 \\ e_o = e_2 - \Delta e_2 \end{cases} \quad (5)$$

From Equation 5 the input and output voltage ratio can be derived $$\frac{e_i}{e_o} = a + \frac{(a-1)^2}{a} \cdot \frac{r_2}{R_L} + \frac{1}{a}\frac{r_1}{R_L} \quad (6)$$

As compared to an ideal lossless transformer, the voltage ratio is not equal to the turns ratio $a$. The deviation may be expressed by a factor D:

$$D = \frac{\frac{e_i}{e_o} - a}{a} = \frac{(a-1)^2}{a^2} \cdot \frac{r_2}{R_L} + \frac{1}{a^2}\frac{r_1}{R_L} \quad (7)$$

As seen from Equation 7 a voltmeter whose input voltage could be directly indicated by the transformer ratio is not possible with such a transformer because the factor D depends on the turns ratio $a$.

It will be shown that when a transformer is designed in such a manner that winding resistances have the following relationship:

$$r_1 = (2a-1)r_2 \quad (8)$$

the correction factor D is independent of the turns ratio:

$$D = \frac{r_2}{R_L} \quad (9)$$

and the input and output voltage ratio for such a transformer is $$\frac{e_i}{e_o} = a\left(1 + \frac{r_2}{R_L}\right) \quad (10)$$

With this type of transformer a measuring system whose input voltage is indicated directly by the turns ratio can be designed by changing the reference voltage by a factor $$\left(1 \Big/ 1 + \frac{r_2}{R_L}\right)$$

FIG. 3 shows a transformer designed with winding resistances according to Equation 8. If the turns from tap 1 to 2 are wound with a wire of resistance $2r$ ohms per turn and the winding from tap 0 to 1 with wire of resistance $r$ ohms per turn, then a series resistance of $n_2 r$ should be connected in series with the primary tap in order to satisfy Equation 8. If the same wire is used for both windings, the winding from tap 0 to 1 can be made from two parallel wires.

The resistance of secondary winding (0–1) of such a transformer is $$r_2 = n_2 r$$

and primary windings (from 1 to 3)

$$r_1 = (n_1 - n_2)2r + n_2 r = (n_1 - n_2) \cdot r$$

The relationship between the winding resistances $$r_1 = \left[\frac{2n_1}{n_2} - 1\right] r_2 = (2a-1)r_2$$

which satisfies Equation 8.

Using a single transformer as in FIG. 1 has its limitation in precision of the measurement. Smaller increments of ratio than one turn cannot be achieved with a single transformer. FIGS. 4A and 4B depict techniques by which separate transformers or separate windings on a transformer can be used to subdivide fixed taps on the transformer. This technique is well known in the ratio transformer field. In FIG. 4a two windings are on the same core. The total number of turns on winding B equals the number of turns between adjacent taps on winding A. By subdividing winding B in decimal or other parts smaller subdivisions of winding A are achieved. The same principle applies to FIG. 4b except since there is a separate winding on core A, winding B can be a separate transformer with any number of turns. Several such transformers or combination of 4a and 4b can be connected in series and accurate turns ratios to several decimal places achieved.

FIG. 5 depicts the described arrangement. To make it usable with a transformer with finite load resistance the condition of Equation 8 must be met. The transformers are designed in such a manner that the sum of the highest possible resistance measured from the input of the transformer to the output of the transformer is always less than the resistance $r_2$ on last transformer A. Furthermore additional resistors $r_{c1}$ to $r_{c10}$ for winding C, and $r_{b1}$ to $r_{b10}$ for winding B are added in series with the taps of every winding. The value of each resistor is adjusted so that the total resistance measured from the input to the taps of transformer A is always equal to $r_2$. Transformer A has winding resistances according to FIG. 3.

One of several possible level indicator systems is depicted in FIG. 6. This circuit uses two thermocouples. The output from the measuring transformer T is fed to the thermocouple TC1 filament, while voltage source $e_s$ is connected to the thermocouple filament TC2. The DC outputs of both thermocouples are in series opposing one another and connected to a sensitive galvanometer. At certain input voltages to TC1 and TC2 the DC outputs from the thermocouples are equal and the galvanometer will indicate zero. If the voltage $e_s$ is adjusted until a null appears on the galvanometer when $e_{ref}$ is applied to thermocouple TC1, this device can be used as a wide frequency range, level-sensing device. Enclosing both thermocouples into a temperature stable enclosure will eliminate drift of the sensed level caused by the temperature dependence of the thermocouple output. In a temperature stable enclosure the temperature of both thermocouples will change at the same rate. Therefore the change of DC output will be nearly equal (when similar thermocouples are used) and will cancel because the outputs are connected in opposition.

FIG. 6 also shows how a resistance in series with thermocouple $TC_2$ could be utilized to reduce measurement error caused by ambient temperature changes.

According to the Equation 10 the voltage ratio of a resistively loaded transformer is:

$$\frac{e_i}{e_o} = a\left(1 + \frac{r_2}{R_L}\right)$$

The resistance $r_2$ in this equation represents the effect of primary and secondary winding resistance of the transformer. This resistance is mostly composed of copper wire and therefore has high positive temperature coefficient. As a result, the output voltage will decrease with increasing temperature which will cause a measurement error. When a resistor $r_s$, as in FIG. 6 is connected in series with thermocouple TC2 and the temperature coefficient of this resistor is chosen so that the voltage on thermocouple TC2 heater changes at the same rate as the output voltage from the transformer, the temperature error of the device is reduced.

The same kind of temperature compensation may be achieved with any other type of reference level indicator when its reference level is made to change at a rate equal to the changing rate of the output voltage.

FIGS. 7, 8A–8B and 9A–9B describe methods to increase the input impedance of the proposed voltage measuring system.

Figure 7:
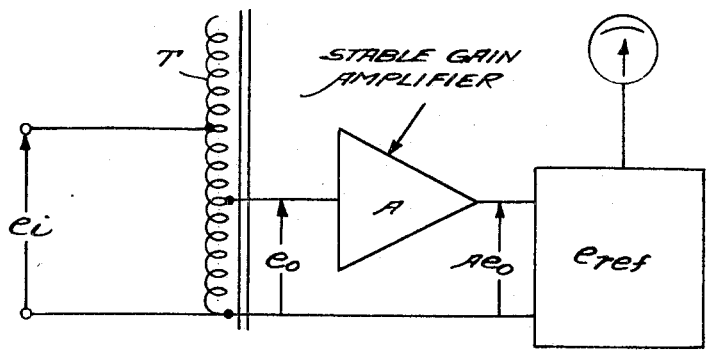
FIG. 7 is a scehmatic electrical diagram of a modification of the basic voltage measuring system depicted in FIG. 1 and wherein an implifier is interposed between the fixed output tap on the variable ratio transformer and the level detector for the purpose of increasing the input impedance of the voltage measuring system and therefore also its sensitivity.

In FIG. 7 a stable high input impedance amplifier is connected between the level indicating system and the output of the measuring transformer T. By means of such amplifier the ratio error expressed by the factor D in Equation 7 can be reduced because the input resistance to the amplifier can be made higher than the input resistance $R_L$ of the level indicator. Furthermore, when the amplifier gain is made larger than one, the sensitivity of the measuring system is increased, and because of the increased load resistance to the measuring transformer, the input impedance of the measuring system is increased.

Besides the load of the level indicator, the input impedance of the described measuring system is composed also of the inductance and stray capacitance of the measuring transformer or transformers.

Figure 8A:
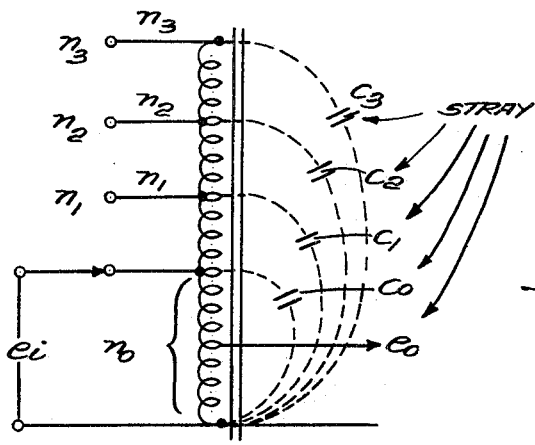

FIGS. 8A and 8B describe a method to reduce the input capacitance. The capacitance is composed of the stray capacitance between the wires of different windings. FIG. 8A illustrates the effect of winding capacitance. The capacitance measured at tap $n_o$ is composed of the capacitance of the winding $n_o$ plus the effect of the capacitances from the windings above the tap $n_o$.

If the stray capacitances to the turns $n_1$, $n_2$, $n_3$ etc. are $C_1$, $C_2$, $C_3$, they increase the capacitance measured at tap $n_o$ by:

$$C = C_1 \cdot \frac{n_1^2}{n_o^2} + C_2 \frac{n_2^2}{n_o^2} + C_3 \frac{n_3^2}{n_o^2} + \quad (11)$$

where $n_o$ is the number of turns to tap $n_o$ $n_1$, $n_2$, $n_3$—number of turns to the winding with stray capacitance $C_1$, $C_2$, $C_3$ Equation 11 shows that the windings above tap $n_o$, which are not really used, may considerably increase the input capacitance of the transformer. This effect is reduced when the connection between sections above the used tap is interrupted as shown in FIG. 8B.

FIG. 9A explains a problem when connecting several transformers in series. To adjust the turns ratio, proper tabs on the transformer have to be selected by switches. The switch contact $a$, going from tap $b$ to $c$ either breaks the circuit between the contacts or shorts the winding $b$–$c$ of transformer T2. Both effects are undesirable because they change the input impedance of the voltmeter and interrupt the voltage to the level detection circuit. FIG. 9B describes a circuit arrangement to reduce this effect. In this circuit the movable member of the switch has two contacts. Only the contact $a$ is connected to the transformer tap in a normal stationary position. Contact $d$ is between the contacts $b$ and $c$, and makes no connection. During the transition, however, contact $d$ is connected to contact $c$ before the connection between $a$ and $b$ is interrupted. A small inductance or resistance is connected between contacts $a$ and $d$ which prevents a short circuit of the winding. In this manner voltage to the output (level measuring circuit) is not interrupted and a short circuit of the windings is prevented.

FIG. 10 shows a method to extend the voltage range of the measuring system by adding a constant ratio input transformer TE to the measuring system. To satisfy the condition Equation 8, the transformer's output resistance $r_1$ should equal the winding resistance $r$ or an additional resistor $r_2$ has to be added to the circuit when $r_1$ is smaller than $r$. When measuring without one extension transformer, a resistor $r$ should be connected into the circuit.

What is claimed is:

1. In a wide-range alternating voltage measuring system, the combination comprising a variable ratio transformer, said transformer including a variable tap across a first section of the transformer winding serving as an input and to which an unknown voltage desired to be measured is connected, and a fixed tap across a fixed number of turns constituting a second section of the transformer winding inductively coupled to said first section and serving as an output, the turns resistance of said variable tap section being twice as high as the turns resistance of said fixed tap section, a resistor connected in series with said variable tap section, said resistor having a resistance value equal to that of said fixed tap section, and a constant level indicating device connected across said fixed tap section, said indicating device including means serving to indicate when said unknown voltage is equal to a set reference voltage or alternatively the deviation from said reference voltage.

2. A wide range alternating voltage measuring system as defined in claim 1 and which further includes switching means having two contacts for each variable tap on said transformer, a first one of said contacts being connected to the tap where the switching means occupies its rest position and the second contact being connected to the tap during transfer of the first contact from one tap to another such that the second contact makes connection to the tap before the first contact loses connection with the tap, and a small impedance in the form of an inductor connected between said first and second contacts for the purpose of eliminating interruption and shorting of the transformer circuit whenever the connection to the transformer tap is changed.

3. A wide range alternating voltage measuring system as defined in claim 1 and whcih, for the purpose of extending the range thereof, includes a fixed ratio transformer connected in the input circuit to which said unknown voltage is applied ahead of said variable ratio transformer, the total resistance including the windings of said fixed ratio transformer at the variable tap on said variable ratio transformer being equal to that of said fixed tap section.

4. A wide range alternating voltage measuring system as defined in claim 1 which comprises a plurality of said variable ratio transformers connected in series by bridging the variable taps such as to enable a finer sub-division of transformer ratio to be obtained.

5. A wide range alternating voltage measuring system as defined in claim 4 wherein the transformers are wound on the same core and wherein the total number of turns on one transformer equals the number of turns between taps on another transformer connected in series therewith.

6. A wide range alternating voltage measuring system as defined in claim 4 wherein the transformers are wound on separate cores.

7. A wide range alternating voltage measuring system as defined in claim 1 which comprises a plurality of said variable ratio transformers connected in series by bridging the variable taps to enable a finer sub-division of transformer ratio to be obtained, the turns resistance of the variable tap section of the last transformer in the series being twice as high as the turns resistance of the fixed tap section of that transformer, and the variable tap sections of the preceding transformers in the series having resistances connected in series therewith such that at each selected series combination of variable taps, the sum of the resistances in the circuit is equal to the resistance of said fixed tap section of said last transformer.

8. A wide range alternating voltage measuring system as defined in claim 1 and which further includes a stable gain amplifier having a high input impedance characteristic connected between said fixed tap section on said transformer and said constant level indicating device thereby to increase input impedance and thereby also to increase the sensitivity of the voltage measurement system.

9. A wide range alternating voltage measuring system as defined in claim 1 and which further includes means for interrupting the windings of said transformer at one or more places above the particular variable tap selected, for the purpose of reducing input capacitance of the transformer.

References Cited

UNITED STATES PATENTS

| | | | |
|---|---|---|---|
| 2,644,135 | 6/1953 | Schnoll | 324—122 XR |
| 3,284,709 | 11/1966 | DePaolo | 324—98 |
| 1,121,835 | 12/1914 | Hiatt | 324—106 XR |
| 1,422,653 | 7/1922 | Berry | 323—47 XR |
| 2,572,545 | 10/1954 | Walker | 323—43.5 |
| 2,832,036 | 4/1958 | Cutler et al. | 323—79 XR |
| 2,889,504 | 6/1959 | Spencer | 323—43.5 XR |
| 3,100,865 | 8/1963 | Nielsen | 323—47 XR |
| 3,113,261 | 12/1963 | Morgan | 323—47 XR |
| 3,122,698 | 2/1964 | Ladd | 323—43.5 |
| 3,179,875 | 4/1965 | Keats | 323—43.5 |
| 3,244,966 | 4/1966 | Gertsch et al. | 323—43.5 |
| 3,305,768 | 2/1967 | Koep | 323—47 XR |

GERARD R. STRECKER, Primary Examiner

ERNEST F. KARLSEN, Assistant Examiner

U.S. Cl. X.R.

323—47; 324—106